US012070679B2

(12) United States Patent
Somadder et al.

(10) Patent No.: US 12,070,679 B2
(45) Date of Patent: Aug. 27, 2024

(54) CLOUD-BASED DISCOVERY SERVICE FOR END-USER DEVICES

(71) Applicant: GOOGLE LLC, Mountain View, CA (US)

(72) Inventors: Guru Somadder, Saratoga, CA (US); Justin Frye, Campbell, CA (US); Bryan Krawetz, Kitchener (CA); Brian Pullen, San Jose, CA (US); Karan Arora, San Francisco, CA (US); Thomas Enders, Mountain View, CA (US); David Ghandehari, Mountain View, CA (US); Jim Ray, Mountain View, CA (US); Cecille Freeman, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 606 days.

(21) Appl. No.: 17/275,126

(22) PCT Filed: Mar. 9, 2020

(86) PCT No.: PCT/US2020/021755
§ 371 (c)(1),
(2) Date: Mar. 10, 2021

(87) PCT Pub. No.: WO2020/190559
PCT Pub. Date: Sep. 24, 2020

(65) Prior Publication Data
US 2022/0032181 A1    Feb. 3, 2022

Related U.S. Application Data

(60) Provisional application No. 62/946,807, filed on Dec. 11, 2019, provisional application No. 62/820,062, filed on Mar. 18, 2019.

(51) Int. Cl.
H04L 67/51        (2022.01)
A63F 13/22        (2014.01)
(Continued)

(52) U.S. Cl.
CPC ............ *A63F 13/327* (2014.09); *A63F 13/22* (2014.09); *A63F 13/235* (2014.09);
(Continued)

(58) Field of Classification Search
None
See application file for complete search history.

(56) References Cited

U.S. PATENT DOCUMENTS 10,181,985 B1 *   1/2019  Passaglia ............... H04L 43/04
2013/0262681 A1 * 10/2013  Guo ...................... G06F 9/5027
                                                            709/226
(Continued)

FOREIGN PATENT DOCUMENTS

JP      2008147768 A      6/2008
JP      2015-076792 A     4/2015
(Continued)

OTHER PUBLICATIONS

Japanese Office Action mailed Oct. 18, 2022 for Japanese Application No. 2021-556227, 12 pages.
(Continued)

*Primary Examiner* — Augustine K. Obisesan

(57) ABSTRACT

An input device, discovery service, and associated discovery and device linking system are provided that allow for adhoc linking of input devices and display devices using discovery key codes. Input devices and display devices are assigned to discovery groups that simplify the process of connecting input devices to display devices for end users.

23 Claims, 6 Drawing Sheets

(51) Int. Cl.
  *A63F 13/235* (2014.01)
  *A63F 13/323* (2014.01)
  *A63F 13/327* (2014.01)
  *A63F 13/352* (2014.01)
  *A63F 13/71* (2014.01)
  *H04L 9/40* (2022.01)

(52) U.S. Cl.
  CPC .......... *A63F 13/323* (2014.09); *A63F 13/352* (2014.09); *A63F 13/71* (2014.09); *H04L 63/065* (2013.01); *H04L 67/51* (2022.05)

(56) References Cited

U.S. PATENT DOCUMENTS

| | | | | |
|---|---|---|---|---|
| 2014/0244996 | A1* | 8/2014 | Parthasarathy | H04L 63/104 713/150 |
| 2014/0344578 | A1* | 11/2014 | Kim | H04W 12/037 713/168 |
| 2015/0289125 | A1* | 10/2015 | Van Phan | H04W 8/005 455/434 |
| 2016/0198332 | A1* | 7/2016 | Chuang | H04W 8/005 455/411 |
| 2017/0164180 | A1* | 6/2017 | Liu | H04L 12/2809 |
| 2017/0332253 | A1* | 11/2017 | Francisco | H04N 21/4183 |
| 2018/0084058 | A1 | 3/2018 | Ajitomi et al. | |
| 2018/0115895 | A1* | 4/2018 | Lehtovirta | H04W 8/005 |
| 2018/0279394 | A1* | 9/2018 | Peng | H04W 12/106 |
| 2018/0295495 | A1* | 10/2018 | Guo | H04W 76/14 |
| 2019/0104398 | A1* | 4/2019 | Owen | H04L 41/22 |
| 2019/0238642 | A1* | 8/2019 | Sesham | H04L 67/1036 |

FOREIGN PATENT DOCUMENTS

| | | | | |
|---|---|---|---|---|
| JP | 2018013882 | A | 1/2018 | |
| JP | 2018-046443 | A | 3/2018 | |
| JP | 2018125800 | A | 8/2018 | |
| KR | 10-2005408 | B1 * | 7/2019 | ......... H04L 63/0823 |
| WO | WO-2016112677 | A1 * | 7/2016 | ............ H04W 12/10 |
| WO | WO-2016165792 | A1 * | 10/2016 | ......... H04L 63/1441 |
| WO | WO-2018026525 | A1 * | 2/2018 | ............. H04L 41/12 |

OTHER PUBLICATIONS

Extended European Search Report mailed Jan. 4, 2022 for EP 21200738.9, 9 pages.
International Search Report and Written Opinion mailed Jun. 22, 2020 for corresponding International Application No. PCT/US2020/021755, 10 pages.
Miera, Jordan, "How to Pair YouTube on a Mobile Device to a TV without Chromecast," Sep. 22, 2014; XP002799354; retrieved from <<https://www.androidcentral.com/pairing -youtube-mobile-device-tv-without-chromecast>> Jun. 10, 2020; 4 pages.
Notice of Allowance mailed Oct. 25, 2022 for European Application No. 21200738.9, 8 pages.
International Preliminary Report on Patentability mailed Sep. 30, 2021 for PCT/US2020/021755, 8 pages.

* cited by examiner

CLOUD-BASED DISCOVERY SERVICE FOR END-USER DEVICES

CROSS-REFERENCE TO RELATED APPLICATIONS

The present application is a U.S. National Stage under 35 U.S.C. § 371 of International Patent Application Serial No. PCT/US2020/021755, entitled "CLOUD-BASED DISCOVERY SERVICE FOR END-USER DEVICES", and filed on Mar. 9, 2020, which claims priority to U.S. Provisional Application No. 62/820,062, entitled "CLOUD-BASED DISCOVERY SERVICE FOR END-USER DEVICES", and filed on Mar. 18, 2019, and U.S. Provisional Application No. 62/946,807, entitled "CLOUD-BASED DISCOVERY SERVICE FOR END-USER DEVICES", and filed on Dec. 11, 2019, the entireties of which are incorporated by reference herein.

BACKGROUND

End-user devices may be capable of connecting with other end-user devices, which can be accomplished using a variety of techniques. For example, a first end-user device may connect to a second end-user device using a cable assembly. Signals passing through the cable assembly may serve to "discover" the other end-user device and subsequently exchange information to form a peer-to-peer network. Other end-user devices may connect to one another using wireless communication, where discovery of other devices may be carried out via electromagnetic signals. Still other end-user devices may connect to one another using cloud-based services provided via the Internet.

BRIEF SUMMARY

According to an embodiment of the disclosed subject matter, devices, systems, and methods are provided in which a discovery service executing on one or more computing systems may register a display device of a plurality of display devices with the service, where the registration is based on a unique identifier of the display device. The discovery service may assign the display device to a discovery group, which associates the display device with other display devices that are permitted by the discovery service to connect to an input device. The discovery service may generate a discovery key code unique to the display device within the discovery group, assign the discovery key code to the display device, and transmit the discovery key code to the display device for display on the display device. An input of the discovery key code may be received from the input device, which allows the input device to be connected to the display device. The input device may be a game controller or the like, and the display device may be a television, monitor, or the like.

The discovery service further may search for one or more display devices that are available to connect to the input device, determine a quantity of available display devices based on the search, and determine a discovery key code length based on the quantity of available display devices. The discovery key code length may be requested by the input device and provided to the input device by the discovery service. The length of the discovery key code may indicate a quantity of inputs to be included in a request for connection to the display device. The length of the discovery key code may be dynamically adjusted based on the quantity of currently registered display devices within the discovery group. The discovery service also may receive a request including an input for connection to the display device from an input device, compare the input with the discovery key code and, upon determining a match, connect the input device to the display device. For example, the discovery service may transmit an offer to connect with the input device upon determining that a match exists between the input and the discovery key code. Where a match does not exist between the input and the discovery key code, the discovery service may further compare the input with one or more additional discovery key codes assigned to one or more additional display devices. For example, the additional devices may include a device connected to a WiFi network to which the input device is connected, a device connected to a subnet to which the input device belongs; and one or more display devices to which the input device has previously connected. As another example, the discovery service may determine that the input matches with a second discovery key code of a second display device on a different WiFi network than the input device is connected to, and subsequently transmit an instruction to connect to the different WiFi network.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

End-user devices that interact using cloud-based services need a way to discover each other's existence and to allow the user to choose which devices should connect. For example, a game controller may connect to one or more available display devices to allow the user to play a game. Display devices may include any device having a display, such as those found in computers, tablets, mobile phones, televisions, and the like. A cloud-based discovery service may assist with connecting devices having input and output capabilities. One example of a discovery service may connect input devices having limited or non-existent display capabilities with display devices having limited or non-existent user-input capabilities.

The present subject matter discloses a discovery service that may match input and display devices by exchanging credentials, allowing the devices to attempt to form a direct connection. If the direct connection succeeds, the devices may be mutually locally reachable and may be considered to have successfully completed discovery.

The discovery service may support a variety of network topologies. For example, a single input device may connect to a single display device. A single input device may also connect to multiple display devices, and/or multiple input devices may all connect to a single display device, where the discovery service may support multiple parallel connections for each device.

Figure 1:
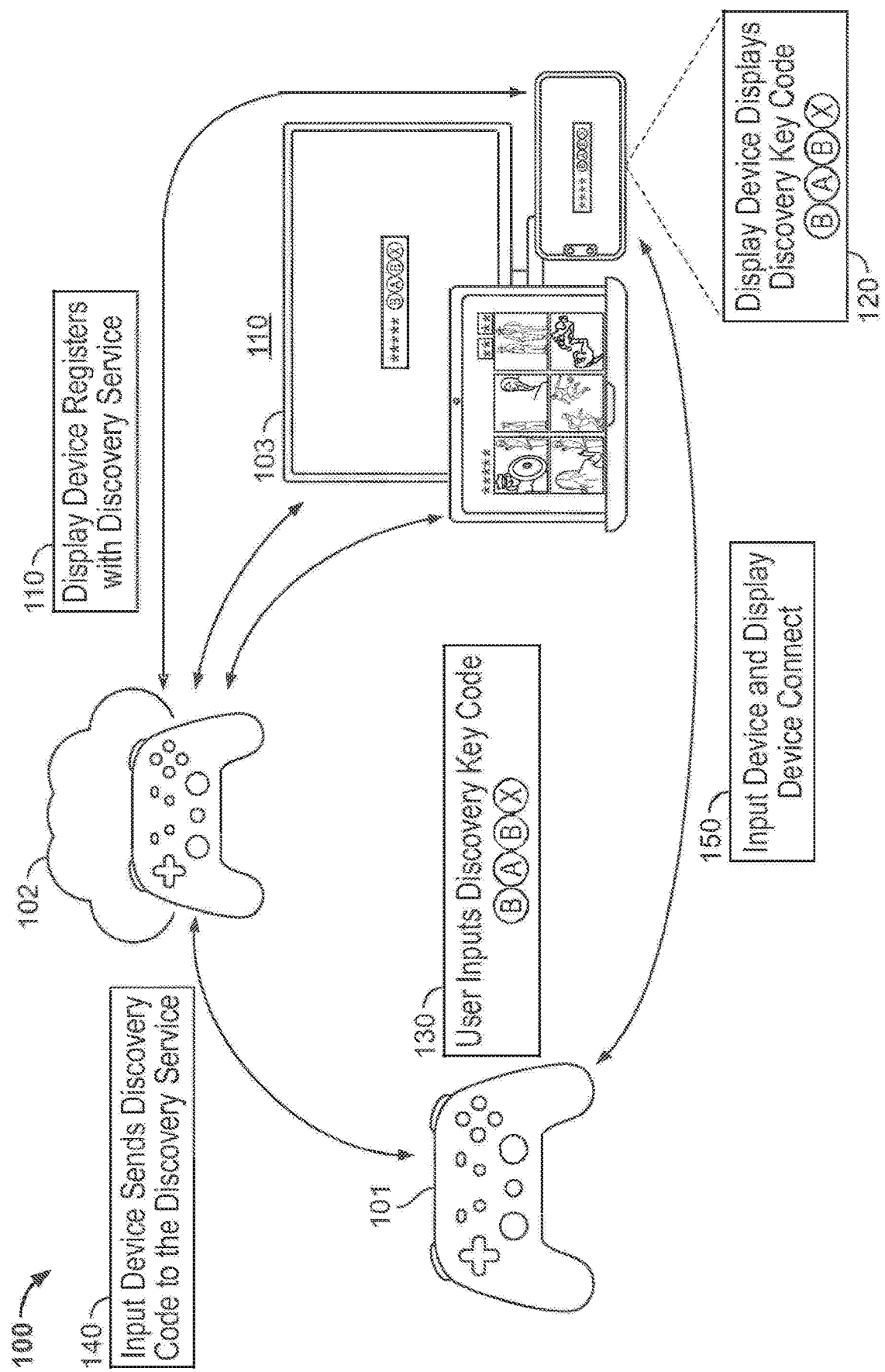
FIG. 1 shows a logical overview of a system according to an embodiment of the disclosed subject matter.

FIG. 1 illustrates a logical overview of an example discovery service system 100. A "discovery service" as disclosed herein may include, for example, a service that coordinates discovery of display devices and input devices, during which one device may determine the existence of one or more other devices and obtain sufficient information to form a network connection with other devices. System 100 may include a discovery service 102 that may coordinate matchmaking between a user input device 101 and a display device 103. A display device may be, for example, any device that can receive and display a discovery key code such as on a screen. A display device also may have the ability to discover input devices and/or to be discovered by other devices, such as devices on a common network with the display device. A display device may be, for example, a smartphone, tablet, smart TV, cable box, OTT box, a video streaming device attached to a TV or monitor, and the like. A display device may be both a display device and an input device.

In an embodiment of the disclosed subject matter, input device 101 may be a game controller. More generally, an input device 101 may include any device capable of transmitting a discovery key code and/or discovering one or more display devices as disclosed herein. As previously noted, a single device may be both an input device and a display device, concurrently or consecutively. The display devices 103 may register with the discovery service in 110 when they become available for connection. Some display devices 103 may be available for a connection at all times, even when in a low-power state, while other display devices 103 may be available for connection only when a software application platform is launched. The discovery service 102 may issue a discovery key code 120 to each display device 103, which may be unique within a relevant local area. A discovery key code may be, for example, a user-visible code that can be displayed on a display device and can be used to connect an input device to a display device. A discovery key code may be unique, and/or it may be sparse within a discovery group. in some cases, each display device may obtain a discovery key code that is unique within its associated discovery group. A "discovery group" is a logical grouping of display devices that are considered to be within a same general geographic area, such as a single home, same building, same campus, or other similar location. In an embodiment, all display devices that share an external IP address typically are considered to be within the same discovery group. A discovery group may be used to provide a limited number of display devices with which a user of an input device may be within reasonable distance to operate. For example, a discovery group may reasonably include all display devices within an apartment unit of a user but not it may not be reasonable for the discovery group to include all display devices within a city. One example of a discovery group may be the local WiFi and wired network within a user's home. The display devices 103 may display the discovery key code 120 on their internal or externally connected displays, and users may enter the discovery key code 120 for the display device 103 that they would like to use with the input device 101. The discovery key code 120 may include of some or all buttons or other forms of input available to the input device 101. The discovery key code 120 may be presented in a variety of formats, based on the type of input device 101 that is seeking a connection. For example, where the input device 101 includes a microphone, the display device 103 may display a word or phrase to be spoken by the user. Once a discovery key code 120 is entered by the user in 130 and transmitted to the discovery service 102 in 140, the discovery service 102 may verify correct discovery key code 120 entry and provide one or more display devices 103, as may be selected by the user, with the information required to communicate with each other, thereby creating a virtual connection between the devices as shown in 150. The discovery service 102 may manage devices entering and leaving participation in the discovery service 102, as well as security considerations. Accordingly, the discovery service 102 may advantageously enable participating devices and software of widely-varying types with very few prerequisites to participate in the discovery service 102.

Figure 2:
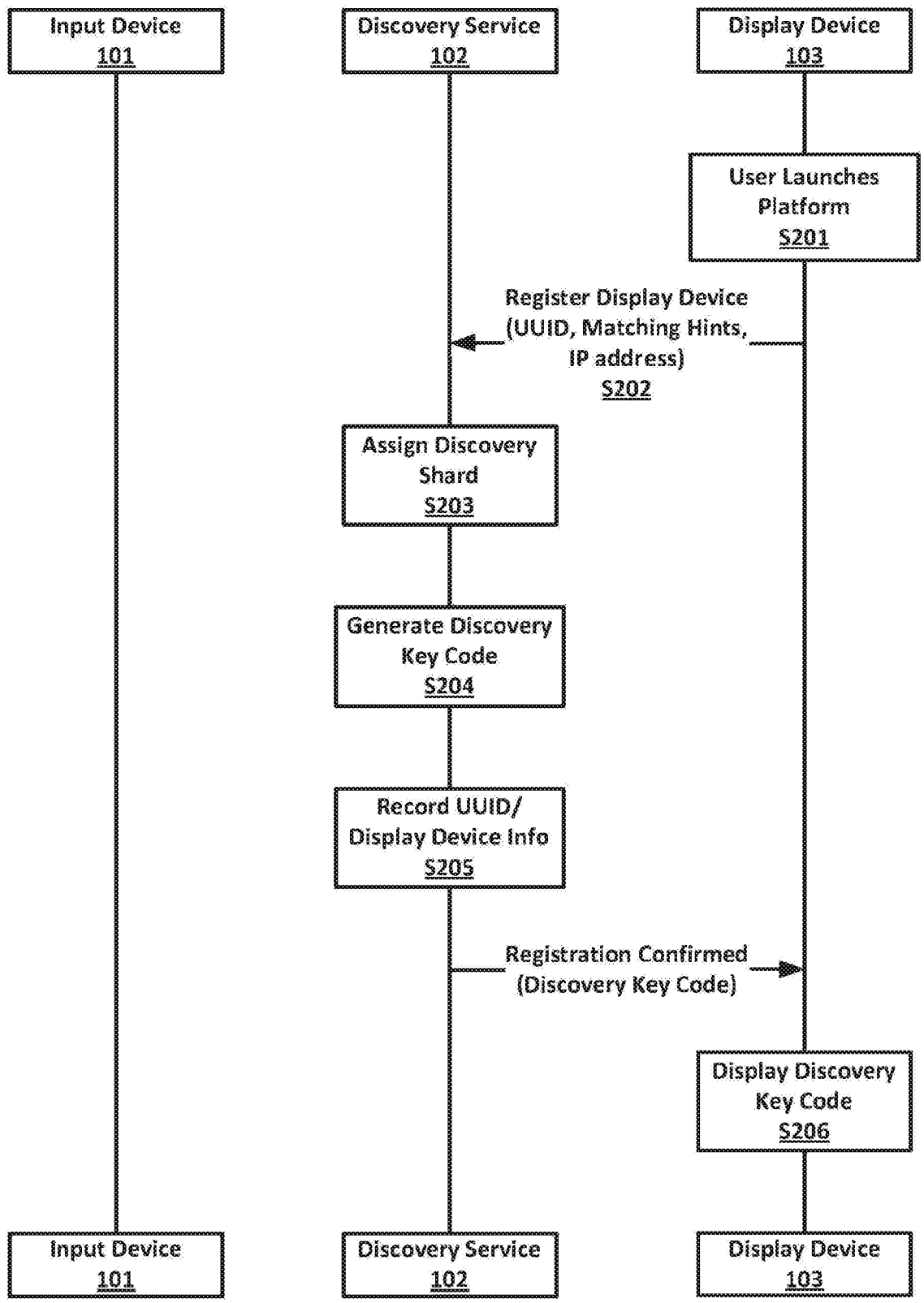
FIG. 2 shows a flow diagram according to an embodiment of the disclosed subject matter.

FIG. 2 is an example flow 200 of registering a display device 103 with the discovery service 102. The user of display device 103 may first launch a software application platform in S201. From the platform, the display device 103 may provide a universally-unique identifier ("UUID") and any matching hints it may collect to discovery service 102. The UUID may uniquely identify the display device 103 amongst all other active display devices 103. The display device 103 may also identify its IP address, which may be an external IPv4 or IPv6 address, to the discovery service 102 in in S202. Discovery service 102 may use one or more of the UUID, matching hints, and IP address conveyed in S202 to assign the display device 103 to a discovery group in S203. The discovery service 102 may filter all registered display devices 103 by their associated external IP address in addition to the matching hints to assign a discovery group. The assigned discovery group may be scanned for a previous registration of the display device 103, and if so, the registration may be updated to an active status from an inactive status. The association between the assigned discovery group and the received UUID may be recorded in S205. Discovery service 102 may generate a discovery key code 120 for the display device 103 in S204. The generated discovery key code 120 may be unique within the assigned discovery group. If the display device 103 is a new registration, the discovery key code 120 may be randomly selected. If the display device 103 has been previously registered, then the previously-assigned discovery key code 120 may be re-assigned the same discovery key code 120. In this way, the user may find it convenient to routinely connect to the same display device 103 using the same input combination. The assigned discovery key code 120, whether newly assigned or previously assigned, may be transmitted to display device 103 where it may be displayed in S206. If there are no remaining input devices 101 seeking to connect with display devices 103, the discovery service 102 may instruct the remaining registered and unpaired display devices 103 to cease displaying the discovery key code 120.

Discovery groups and discovery group assignments may be modified dynamically based on patterns of use. In some cases, the modification may ignore the usual factors that determine discovery groups and discovery group assignments, such as the external IP address of the connecting device. For example, an input device 101 that powers on and registers with discovery service 102 may be assigned to a discovery group based on, among other factors, its external IP address. A pattern of use may reveal that the input device 101 has historically connected to a display device 103 a predetermined number of times using a different IP address. The initial discovery group assignment of the input device 101 may be subsequently modified based on this pattern of use so to as place the input device 101 within the same discovery group as the previously-connected display device 103. Therefore, even though the IP address of input device 101 has changed with its most recent registration with the discovery service 102, the system may assume that the input device 101 has not moved geographically and that both it and its usual display device 103 should still be assigned to the same discovery group. Should the user subsequently direct the input device 101 to connect to a different display device 103, the discovery service 102 may take notice and not assign the input device 101 having the same IP address to the discovery group with the display device 103 when the input device 101 registers with the discovery service 102 in the future. Rather, the input device 101 may be assigned to a discovery group based on its IP address in the usual fashion. Similar to modifying the assignment of the input device 101, two discovery groups may also be merged so as to include devices having disparate IP addresses or IP address prefixes.

As discussed previously, the discovery service 102 may store previously-connected pairs of input devices 101 and display devices 103 based on their UUIDs. In an embodiment, an input device 101 that powers on and connects with discovery service 102 may automatically connect with a previously-connected display device 103 without regard for whether the two currently exist within the same discovery group. In connecting, the display device 103 may be powered-on from an off or low-power state. The automatic connection may be disabled where the network to which the input device 101 is connected differs from the network to which the display device 103 is connected. The network may differ based on differences in the IP addresses of the input device 101 and display device 103 and/or based on the SSID of a wireless network, for example. Qualifying the automatic connection feature based on the identification of the network to which each of the input device 101 and display device 103 is connected may prevent, for example, a scenario where a user powers on an input device 101 from his/her office and a display device 103 located at the user's home and connected to the user's home WiFi network is powered-on.

Matching hints may be useful in merging display devices 103 into a candidate set from other external IPs and subnets, or out of the candidate set within an external IP and subnet. Some examples of matching hints may include previously-connected display device 103 identifiers, previously connected structure identifiers, IP address information, IP prefix information, WiFi SSI Ds, geographic location information, and the like. For example, it may be assumed that a first number of bits, known as a prefix, of an IPv6 address of a device may identify a router being used by the device. It may also be assumed any other devices having the same prefix may be co-located in the same geographic area. As a result, the discovery service 102 may assign all registered devices having the same IPv6 prefix to the same discovery group.

The discovery service 102 may keep track of valid, active, registered display devices 103 to maintain the validity of each discovery key code 120, as well as to send confirmation to the display device 103 once the discovery key code 120 has been correctly entered. Several methods may be employed to do so. In an embodiment of the disclosed subject matter, the display device 103 may poll the discovery service 102 to check if the discovery key code 120 has been successfully entered by the input device 101. Alternatively, or in addition, the display device 103 may utilize push notifications in the form of open HTTP Long POLL requests, which could be answered once the discovery key code 120 was entered. Using static sharding may introduce additional available connections but may reduce the complexity of dynamic sharding. Preferably, each display device 103 may already be registered to receive notifications through a standard notification service, and this infrastructure may be leveraged to maintain a list of valid discovery key codes and to provide confirmation notifications to the display device 103 once the correct discovery key code 120 has been entered.

Figure 3:
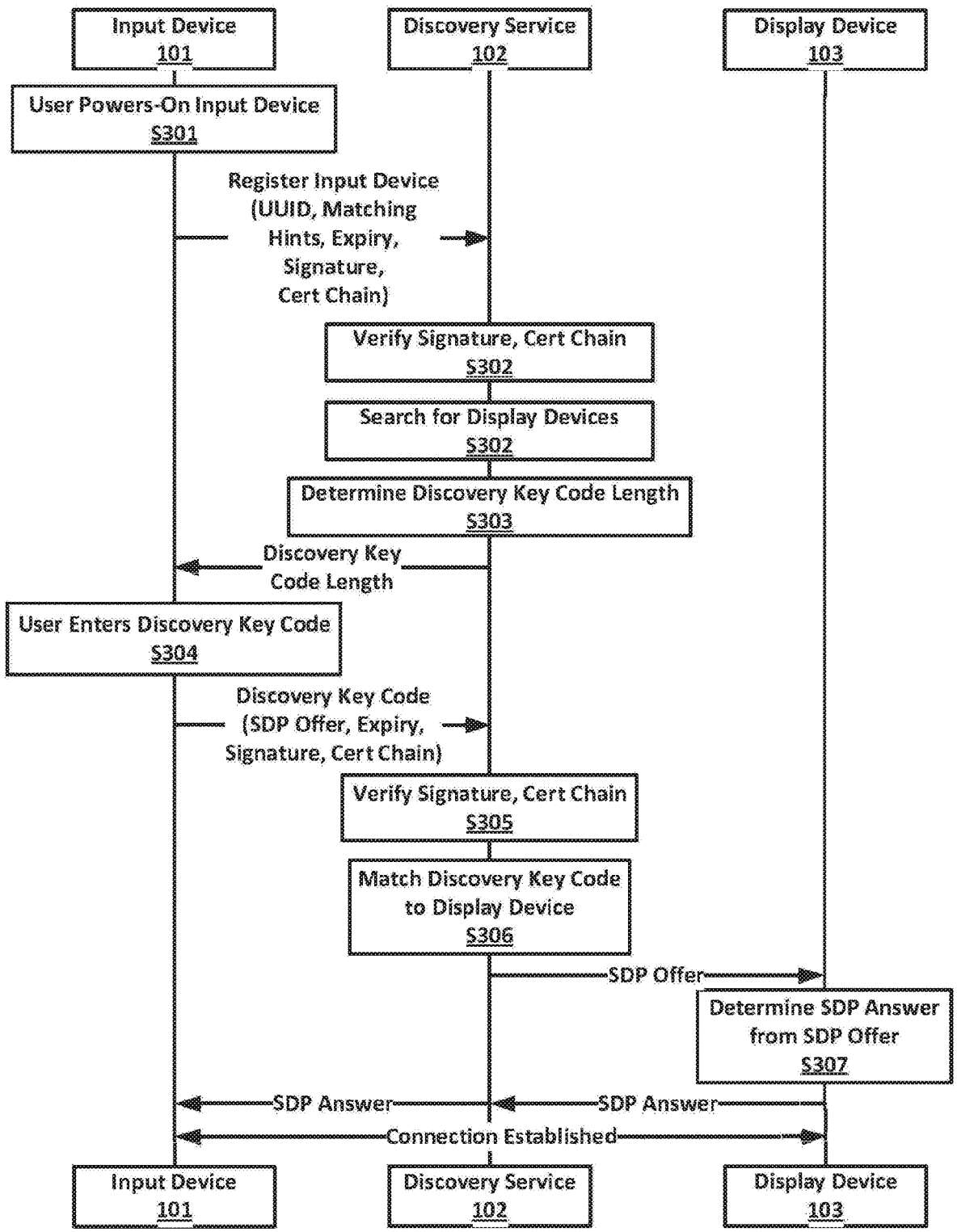
FIG. 3 shows a flow diagram according to an embodiment of the disclosed subject matter.

FIG. 3 shows an example flow 300 of registering and pairing a client device 101 with a display device 103. Upon powering-on the input device 101 in S301, the input device 101 may attempt to register with discovery service 102 by passing a UUID, any matching hints it may collect, and an expiry, all signed with its private key. The discovery service 102 may verify the signature with the public key and validate that the certificate chains to a trusted root in S302. Based on relevant factors, such as the external IP address or WiFi SSID of the input device 101, the discovery service 102 may perform a search to determine all display devices 103 with which input device 101 may be permitted to connect. Based on the quantity of display devices 103 deemed available for connection by the input device 101, the discovery service 102 may determine the discovery key code length. Illustrative examples of discovery keys and associated attributes are provided in Table 1. In general, the greater the number of available display devices 103, the greater the discovery key code length may be in order to maintain a unique discovery key code for each display device 103. In response to verifying the signature and certificate chain of the input device 101 in S302, existing discovery groups may be merged, split, created, or removed altogether. The registration of input device 101 may provide additional information about the context of other display devices 103 within the overall system that prompts reorganization of the discovery groups. For example, two groups of display devices 103 existing in separate discovery groups may be merged into a single discovery group based on receiving the registration of an input device 101 determined to be located at a geographic midpoint between the discovery groups. The input device 101 may additionally request the length of the discovery key code 120 that the discovery service 102 may accept in S303. The discovery service 102 may return the discovery key code 120 length, which will indicate to the input device 101 the number of button or other input presses to collect in a request to the discovery service 102 for connection to a display device 103. The user may enter a discovery key code 120 in S304 for a desired display device 103 using the input device 101. As the discovery key code 120 is being entered, the input device 101 may provide haptic, visual, or audio feedback to the user to indicate progression and incorrect entries. The discovery key code 120 may then be passed to the discovery service 102 along with an SDP offer and an expiry, signed with its private key. As before, the discovery service 102 may verify the signature with the public key and validate that the certificate chains to a trust root in S305. The discovery service 102 may match the input device 101 with the set of all candidate display devices 103 that may be in the same discovery group. If a matching display device 103 is found, an SDP offer may be transmitted to a display device 103. If a matching display device 103 is not found, a more intensive search may be performed by the discovery service 102 using, for example, the list of all display devices 103 connected to the same WiFi SSID, the list of all available display devices 103 on the requesting subnet and related discovery groups, and the list of previously connected display devices 103 for the particular input device 101. Using this additionally collected information, the discovery service 102 may attempt to determine the most likely display device 103 that the user is trying to discover. If none of the display devices 103 discovered using this information have the asserted discovery key code 120, then a failure notification may be returned to the input device 101. Referring now to S307, where the discovery service 102 may succeed in matching the discovery key code 120 to a registered display device 103, the display device 103 may receive the SDP offer and determine an SDP answer from the SDP offer. The display device 103 may transmit the SDP answer to the discovery service 102, which may forward the SDP answer to the input device 101. At this point, the input device 101 and display device 103 may be connected using the SDP offer and SDP answer. The input device 101 may store the connected display device 103 as a default display device. Where the display device 103 and input device 101 fail to connect, the input device 101 may send a connection failure message to the discovery service 102. The discovery service 102 may respond with a message to switch to a specific WiFi access point by sending a SHA-256 hashed SSID. The input device 101 may then switch to the specific access point and retry with the discovery service 102 returning to S304. Once discovery is complete and a connection between the input device 101 and a display device 103 has been made, the input device 101 may unregister from discovery service 102.

Each input device 101 may have a unique public-private key-pair and associate certificate programmed from the time of manufacture. The private key may be used to prove to the discovery service 102 that the input device 101 may be trusted. Other types input devices may be similarly provided with a key-pair to authenticate with the discovery service 102 in order to enforce a certification program.

Figure 4:
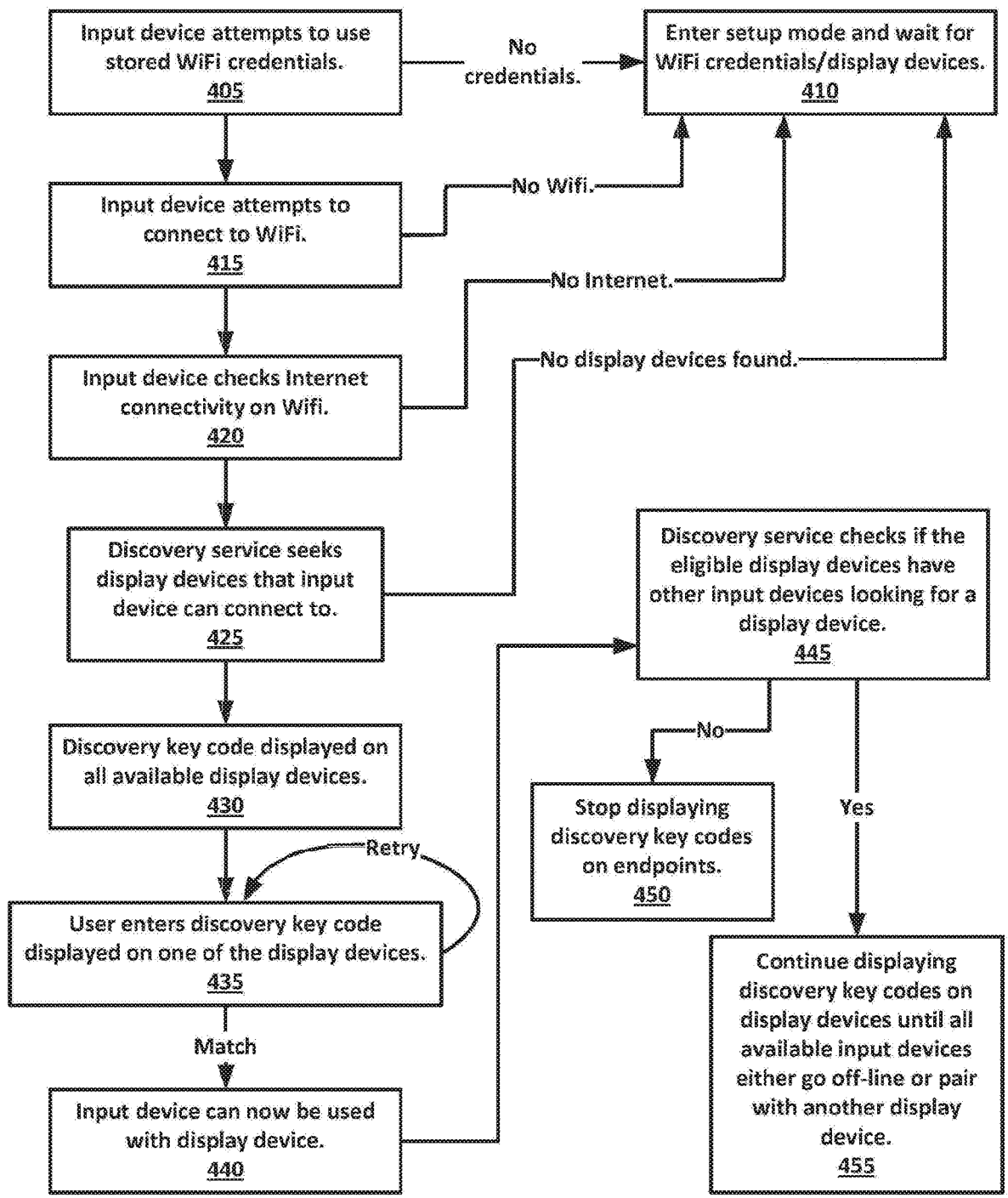
FIG. 4 shows a flow diagram according to an embodiment of the disclosed subject matter.

FIG. 4 shows an example flow 400 of connecting an input device 101 with a display device 103. Input device 101 may contain hardware components enabling it to connect to a network, such as a WiFi network and/or the Internet. Input device 101 may also contain a memory storage device that stores credentials for authenticating itself to one or more networks, such as a WiFi network.

Upon powering-on, input device 101 may attempt to connect to the WiFi network(s) for which it has credentials already stored in stage 405. If these WiFi network(s) are not available or if these WiFi networks do not have Internet connectivity, the input device 101 may enter a setup mode and wait for WiFi credentials to be received in stage 410.

At stage 415, input device 101 may attempt to connect to one or more WiFi networks for which it has stored credentials. If this attempt is unsuccessful for any reason, input device 101 may enter the setup mode and wait for WiFi credentials to be received in stage 410. Users may find it convenient to automatically connect to the same WiFi network used previously. The input device 101 may store any number of WiFi network names, but preferably stores only a single WiFi network name in order to facilitate a more seamless and simpler user experience that may appear less complicated by eliminating the step of selecting a WiFi network where it can be avoided.

At stage 420, following a successful connection to a WiFi network, input device 101 may check whether the Internet is accessible from the connected WiFi network. If the Internet is not available, input device 101 may enter the setup mode and wait for WiFi credentials to be received in stage 410.

At stage 425, after verifying that the Internet is accessible from the connected WiFi network, input device 101 may register with discovery service 102. In response, discovery service 102 may seek display devices 103 that input device 101 can connect to. Where no display devices 103 are found that input device 101 can connect with, the input device 101 may connect to a different WiFi network, or enter the setup mode in stage 410 and wait for either new display devices 103 to become registered with the discovery service 102 or for new WiFi credentials to be received. After a threshold period of time, the input device 101 may power down if it has not succeeded in connecting to a display device 103.

As with input device 101, display device(s) 103, once powered-on, may also register with discovery service 102 and wait for an input device 101 to connect to it. Discovery service 102 may determine whether there are input devices 101 seeking to connect nearby and may direct display device 103 to display a discovery key code 120 in stage 430. For a given display device 103, if there exists any input device in the discovery state that could connect to that display device 103, the discovery key code 120 may be displayed. Otherwise, discovery service 102 may not direct display device(s) 103 to display the discovery key code 120. If some display devices 103 register with discovery service 102 after an input device 101 has started seeking a display device 103, then these newly-registered display devices 103 may also display a discovery key code 120 so that an input device 101 may connect. This scenario may occur when a user powers-up his or her input device 101 while waiting for a display device 103 to boot or complete the power-on process.

The discovery key code 120 generated by discovery service 102 may be fairly short due to the manner in which the universe of all possible registered display devices 103 may be narrowed to a smaller set, as described herein. A shorter discovery key code 120 may allow for a more convenient user experience, since it requires less effort to input via input device 101 and may be committed to memory with relative ease.

The discovery system 100 may support both IPv4 and IPv6 addresses. Both types of addresses may be hierarchical and may be useful in narrowing the universe of registered display devices 103 to a smaller subset. A unique discovery key code for each registered display device 103 may be conceptually possible. For example, if there are 100 million registered display devices 103, then there are 100 million multiplied by a security factor of $10^2$, which results in 10 billion unique codes. Preferably, the discovery key code 120 is less than six characters, where fewer characters may be understood to be less burdensome to the user. To achieve this, the discovery system 102 may "shard" the universe of 10 billion unique discovery key codes into a minimum of 10,000 shards, each having $10^6$ unique discovery key codes 120.

Preferably, each discovery group will contain a relatively small of available display devices 103, such as ten or less, so that the number of characters in the discovery key code 120 may be limited to four characters or less. The number of characters may be fixed or variable and set such that the discovery service 102 does not encounter difficulty issuing unique discovery key codes 120 nor is it likely that one user could guess the discovery key code 120 of a particular display device 103. For each discovery group, each discovery key code 120 may preferably differ by more than one character, which will reduce the likelihood of accidental connection to a registered display device 103. Because it may be relatively easy to make an input entry mistake that results in the entered discovery key code 120 being off by one character, two discovery key codes 120 within the same discovery group should not be offset by a circular shift of one position to reduce the likelihood of an accidental connection.

Where possible, the same discovery key codes 120 for display devices 103 on proximate WiFi networks should not be re-used. For example, a first WiFi network to which display device A is connected should avoid using a discovery key code 120 that was previously used by display device B on a nearby second WiFi network, especially where both the first and second WiFi networks would be visible or within transmission range.

In some cases, an input device 101 may be used where two or more WiFi networks are visible. For example, the user may be in a building having two floors with a different WiFi network router on each floor with different SSI Ds. There may even be additional WiFi networks on the same floor. In this situation, the user may have most recently used the input device 101 in a first WiFi network, but subsequently intends to use input device 101 on a second WiFi network, while both networks are visible to input device 101. This situation may invoke special treatment by the discovery service 102 to avoid a potential problem where the input device 101 connects to the first WiFi network and the user may be unable to connect to their intended display device 103 that is connected to the second WiFi network. Therefore, WiFi networks may receive special treatment where they are identified as having been set up for use with the same input device 101 and by being visible to that input device 101 at the time when that input device 101 is accepting input of a discovery key code 120. In this situation, all available display devices 103 in these co-visible WiFi networks may be assigned unique discovery key codes 120. This step may become easier and less disruptive if it is possible to preassign unique discovery key codes 120 to display devices 103 in WiFi networks that are proximate. When this input device 101 is accepting discovery key codes 120, all display devices 103 in all WiFi networks that are both known and visible to the input device 101 at that time should become available for discovery key code 120 entry. In other words, all display devices 103 would display their unique discovery key code 120, even if they are on a different WiFi network than the input device 101 at that time. If the user enters a discovery key code 120 for a display device 103 that is on the same WiFi network as the input device 101, the link is established, and the session begins as normal. If the user enters a discovery key code 120 for a display device 103 on one of the other WiFi networks, the discovery service 102 may instruct the user's input device 101 switch to that WiFi network. Once the WiFi connection is reestablished, the session begins with the display device 103 selected by the user on the other WiFi network.

It may be expected that most users will typically connect to a small number of display devices 103 that they frequently use. Therefore, to the extent possible, discovery service 102 may attempt to maintain the same discovery key codes 120 for each display device 103 within a discovery group. This may reduce friction in the user experience in that the user may find it more convenient to enter the discovery key code 120 using the input device 101 from his or her memory. In an embodiment of the disclosed subject matter, the discovery key code 120 assigned to a display device 103 may only change in the rare case when a display device 103 joins the WiFi network where a registered display device 103 is already using the same discovery key code 120.

In one example, an input device 101 may provide eight different gaming inputs, such as "X," "Y," "A," "B," "up," "down," "left," and "right." To avoid counting mistakes when entering discovery key codes 120, consecutive sequences of repeating the same input more than twice should be avoided. Based on the available display devices 103 within the discovery group, the length of the discovery key code 120 and inputs to be used in entering the discovery key code 120 may be established according to the rules provided in the following table.

TABLE 1

| Number of available display devices in discovery group | Discovery Key Code Length | Inputs to Use | Other Guidelines |
| --- | --- | --- | --- |
| <4 | 3 | A, B, X, Y | Each unique discovery key code should start with a different input. |
| 5-10 | 4 | A, B, X, Y | |
| >10 | 8 | A, B, X, Y, up, down, right, left | |

It should be understood that not all display devices 103 should register with discovery service 102 and display a discovery key code 120. Instead, registration with discovery service 102 may be limited to display devices 103 that have the capability to interact with an input device 101, and, even when having the capability, are not otherwise excluded from being selected by the user for any reason.

Alternatively, where input device 101 is capable of wired communications, it may be connected or otherwise "plugged-in" to a display device 103. In this case, the input device 101 may behave as a human interface device (HID), and it may not be necessary for the input device 101 to register with discovery service 102. While an input device 101 that is powered-on may not be registered with discovery service 102 or actively seeking a display device 103, the input device 101 may nevertheless be identified by discovery service 102 regardless of whether input device 101 has established a wired connection with a (registered or unregistered) display device 103.

At stage 435, in response to seeing a discovery key code 120 displayed on a display device 103 registered with discovery service 102, a user may attempt to enter the discovery key code using input device 101. If the user enters the discovery key code 120 incorrectly, the input device 101 may produce an indication of the same. The indication may be provided haptically in the form of a vibration, visually on a display or through illuminating an LED, or by emitting a sound. In this way, the user may be made aware that the discovery key code was entered incorrectly. At the same time, the discovery service 102 may reset the input for the discovery key code entry. Therefore, upon receiving the indication from input device 101, the user will understand that the code may need to be re-entered from the beginning. As the user incrementally enters a discovery key code 120 using his or her input device 101, the associated display device 103 having the same discovery key code 120 prefix may show incremental feedback on its display to acknowledge the correct entry of each character. Where the discovery key code 120 being entered by the user using the input device 101 does not match the discovery key code 120 being displayed by the display device 103, no incremental feedback may be shown.

Following correct entry of the discovery key code 120 in stage 435, the input device 101 may connect to display device 103 in stage 440 and proceed to interact with display device 103 in whatever manner provided, such as to play a game, for example. The user may disconnect input device 101 from a connected display device 103 at any time and connect to a different display device 103. When a user attempts to disconnect from the display device 103 that he or she is currently connected, an interface may be displayed on display device 103 that prompts the user to end the current session, connect to a different display device 103 with a list of discovery key codes 120 for other available display devices 103, and to cancel the disconnection. The list of available display devices 103 may be updated dynamically such that if n display devices are currently registered with discovery service 102 and an n+1th display device 103 becomes newly registered, then the n+1th display device 103 should also display a discovery key code 120. Connecting to a new display device 103 may be carried out similarly by allowing a user to enter the discovery key code 120 of the new display device 103.

It should be appreciated that many users may routinely connect their input devices 101 to the same display device 103. Therefore, upon powering-on the input device 101, the input device 101 may attempt to connect with the display device 103 that was last-used, or most-frequently-used if that display device 103 is powered-on and registered with discovery service 102. If the last-used or most-frequently-used display device 103 is not available, then discovery key codes 120 may be displayed on all registered, i.e. available, display devices 103.

At stage 445, the discovery service 102 may check if other registered display devices 103 have other input devices 101 seeking a link. If so, the discovery service 102 may, in stage 455, instruct those registered display devices 103 to continue displaying discovery key codes 120 until all seeking input devices 101 either go off-line or become linked with another display device 103.

When the discovery service 102 detects that there are no input devices 101 seeking to connect to a display device 103 or group of display devices 103, the discovery service may direct those registered display devices 103 to cease displaying their respective discovery key codes 120.

While each display device 103 may have a unique UUID, as previously discussed, a user may need only enter a substantially shorter discovery key code 120 to connect. Therefore, it may be possible that a malicious actor could enter the discovery key code 120 of a display device 103 that he or she should not be able to connect to, for example, by looking over the shoulder of the user. These types of "attacks" may be mitigated, however. For example, the discovery system 100 may require that the attacker be mutually reachable by an internal IP address from the discovered display device 103 in order to successfully connected. Alternatively, or in addition, the discovery system 100 may require that the attacker be mapped to a discovery group where the search algorithm will discover the display device 103 that is being attacked. Additional identity security protections may be provided to further prevent the attacker from acting as the user, even where the attacker successfully connects to a display device 103.

There may also exist a possibility of where a discovery key code 120 may be guessed. Depending on the sparsity of the code space, or in other words, how many devices are allowed to map to a single discovery group, discovery key codes 120 may be guessed either accidentally or maliciously. When this occurs, the same mitigations previously discussed may apply, including that the discovery system 100 may not provide access to any user account data. It should be appreciated that the discovery of a display device 103 and the identity of a user associated with the display device 103 are separate.

Before discovery takes place, any errors may result in the input device 101 performing an error response. The errors may be communicated to the user in a variety of ways, including through the input device 101 itself or through another device of the user, such as a smartphone. After the failure occurs and an idle timeout expires, the input device 101 may power-down or transition to a sleep state. Some examples of failures, descriptions, and responses may be summarized in the following table.

| Failure | Description | Response |
| --- | --- | --- |
| Can't connect to WiFi. | The input device does not have valid WiFi credentials. | Go into OOBE mode, looking for a phone to provide WiFi credentials. |
| WiFi does not have Internet access. | The input device is connected to a WiFi access point, but cannot reach the Internet. | Indicate failure or continue to retry with exponential backoff delay. |
| Failure to connect to discovery service. | The discovery service is experiencing a problem. | Indicate failure or continue to retry with exponential backoff delay. If the display device cannot connect to the discovery service to get its discovery key code, it may display a clear error instead of the code. |

-continued

| Failure | Description | Response |
|---|---|---|
| Discovery service responds with a 500 HTTP error code. | The discovery service is experiencing a problem. | Indicate failure or continue to retry with exponential backoff. |
| Discovery service responds with a 403 HTTP error code. | The input device does not have a recognized certificate. Either the input device is counterfeit or the public key for the controller has been revoked. | User should contact customer service for a replacement input device. |
| Discovery service responds with a 404 HTTP error code. | The input device sent a discovery key code that does not match any candidate display devices. | Input device should briefly indicate failure and allow the user to try again. No indication may be provided on the display. If this occurs three times, go into OOBE mode until the next power cycle. |
| Failure to establish local connectivity. | The display device and the input device cannot connect over the local network. | The input device and the display device should report to the discovery service, and the discovery service may direct the devices to retry. The controller should briefly indicate failure and allow the user to try again. No indication may be provided on the display. If this happens three times, go into OOBE mode until the next power cycle. |
| Local connectivity established, but unrecognized message received. | Either the input device or the display device has a mismatched version. | The unrecognized message should be ignored if possible. If not possible to ignore the message, the input device should disconnect, and the display device should display a message and disconnect. The offending display device should eventually time out. |
| Local connectivity established, but keepalive timed out. | Either the input or display device has lost connectivity. | Indicate failure or continue to retry with exponential backoff. |

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a system as disclosed herein.

Figure 5:
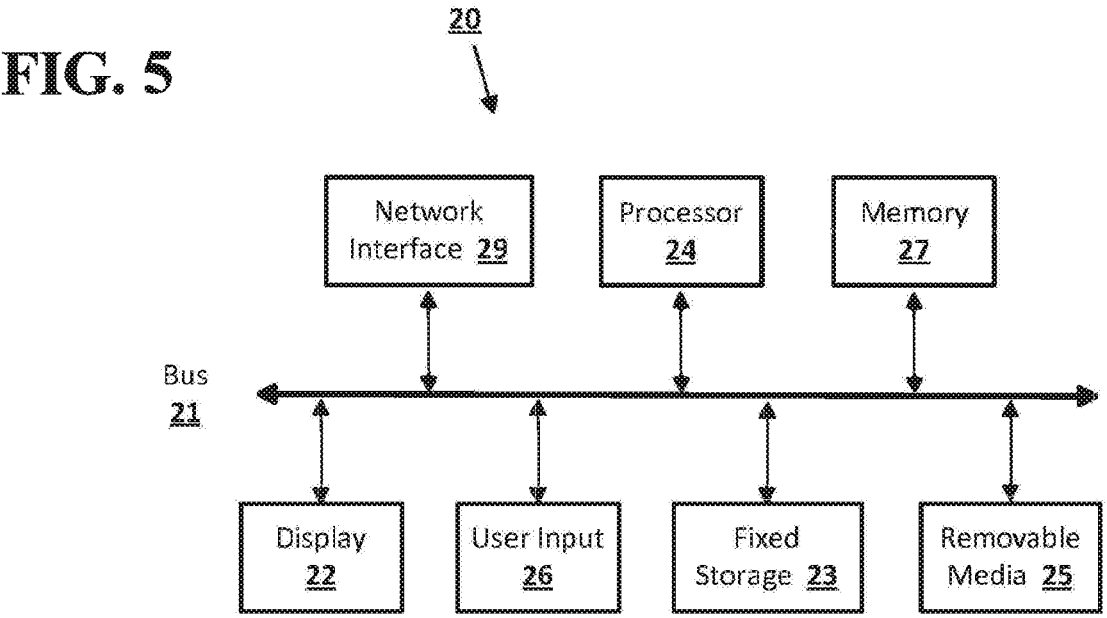
FIG. 5 shows a computing device according to an embodiment of the disclosed subject matter.

Embodiments of the presently disclosed subject matter may be implemented in and used with a variety of component and network architectures. FIG. 5 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted.

Typically, RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces.

The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
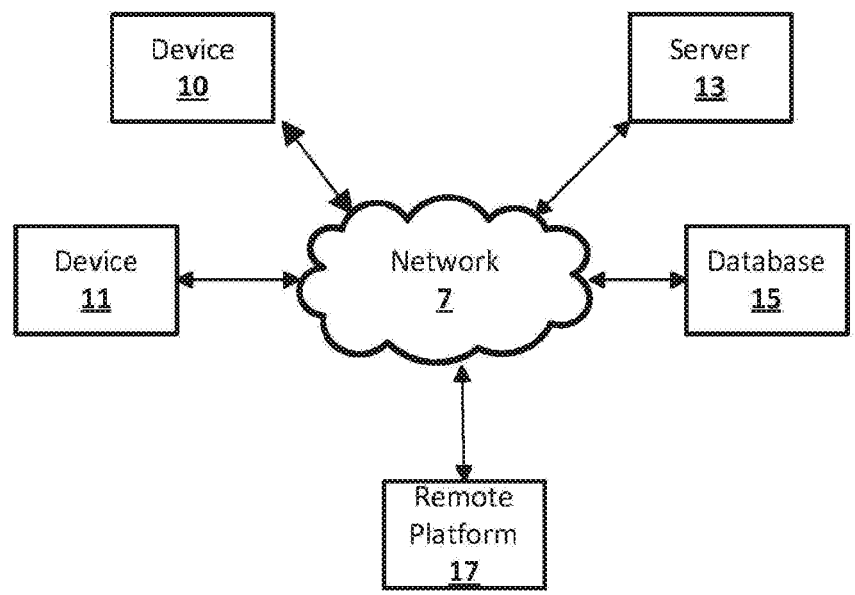
FIG. 6 shows a network configuration according to an embodiment of the disclosed subject matter.

FIG. 6 shows an example network arrangement according to an embodiment of the disclosed subject matter. One or more devices 10, 11, such as local computers, smart phones, tablet computing devices, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 7:
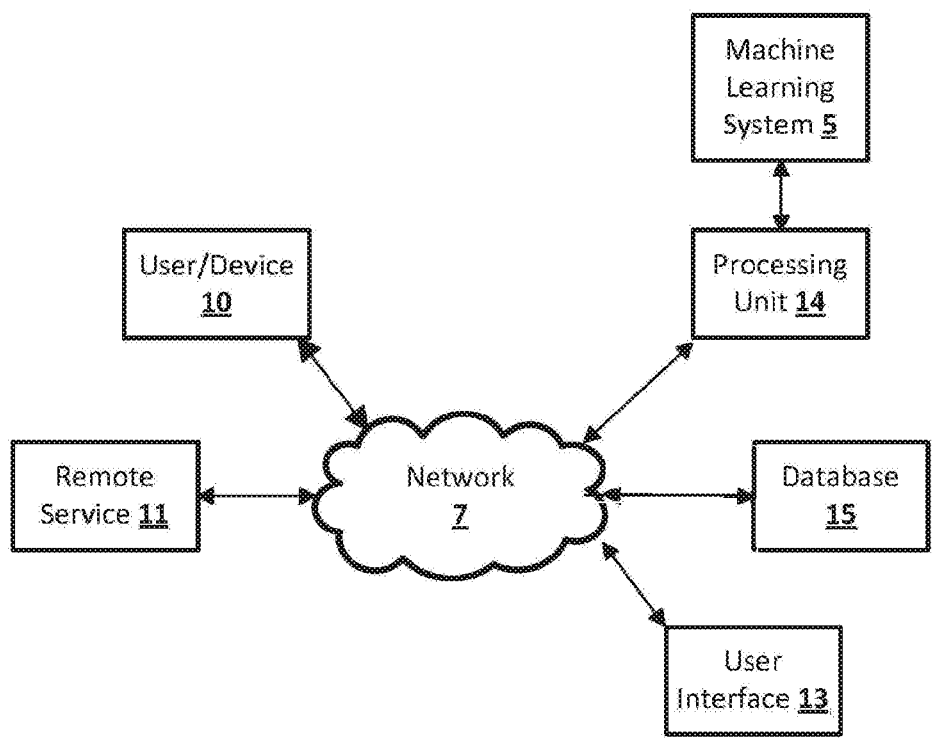
FIG. 7 shows an example network and system configuration according to an embodiment of the disclosed subject matter

FIG. 7 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

In the following some examples are described.

Example 1: A computer-implemented method comprising:
    registering, by a discovery service executing on one or more computing systems, a display device of a plurality of display devices, the registration based on a unique identifier of the display device;
    assigning, by the discovery service, the display device to a discovery group, the discovery group associating the display device with other display devices of the plurality of display devices that are permitted by the discovery service to connect to an input device;

generating, by the discovery service, a discovery key code unique to the display device within the discovery group;
assigning, by the discovery service, the discovery key code to the display device; and
transmitting, by the discovery service, the discovery key code to the display device for display on the display device.

Example 2: The method of example 1, further comprising:
receiving an input of the discovery key code from the input device; and
connecting the input device to the display device.

Example 3: The method of example 1 or 2, wherein the input device is a game controller and the display device comprises a television or monitor.

Example 4: The method of at least one of the preceding examples, further comprising:
searching, by the discovery service, for one or more display devices of the plurality of display devices that are available to connect to the input device;
determining a quantity of available display devices based on the searching; and
determining a discovery key code length based on the quantity of available display devices.

Example 5: The method of example 4, further comprising:
receiving, by the discovery service from the input device, a request for the discovery key code length; and
transmitting, by the discovery service, the length of the discovery key code to the input device, the length of the discovery key code indicating a quantity of inputs to be included in a request for connection to the display device.

Example 6: The method of example 4 or 5, wherein the length of the discovery key code is dynamically adjusted based on the quantity of currently registered display devices within the discovery group.

Example 7: The method of at least one of the preceding examples, further comprising:
receiving, by the discovery service, a request including an input for connection to the display device from an input device; and
comparing, by the discovery service, the input with the discovery key code.

Example 8: The method of of at least one of the preceding examples further comprising:
transmitting, by the discovery service to the display device, an offer to connect with the input device in response to the determining that a match exists between the input and the discovery key code.

Example 9: The method of example 8, further comprising:
in response to determining that a match does not exist between the input and the discovery key code, comparing, by the discovery service, the input with one or more additional discovery key codes assigned to one or more additional display devices of the plurality of display devices selected from at least one of:
a device connected to a WiFi network to which the input device is connected;
a device connected to a subnet to which the input device belongs; and
one or more display devices to which the input device has previously connected.

Example 10: The method of example 9, further comprising:
receiving, by the discovery service from the display device, an answer to connect to the input device.

Example 11: The method of example 8, further comprising:
determining, by the discovery service, that the input matches with a second discovery key code of a second display device of the plurality of display devices on a different WiFi network than the input device is connected to; and
transmitting an instruction, by the discovery service to the input device, to connect to the different WiFi network.

Example 12: The method of at least one of the preceding examples, wherein the display device is assigned to the discovery group based on a matching hint that indicates at least one of:
an IP address of the display device;
a WiFi network to which the display device is connected;
a wired network to which the display device is connected;
a geographic location of the display device; and
a previously-used identifier of the display device.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
registering, by a discovery service executing on one or more computing systems, a display device of a plurality of display devices based on a unique identifier of the display device;
assigning, by the discovery service, the display device to a discovery group, the discovery group associating the display device with other display devices of the plurality of display devices that are permitted by the discovery service to connect to an input device;
generating, by the discovery service, a discovery key code unique to the display device within the discovery group and a discovery key code length indicating a quantity of inputs of the input device to be included in a request for connection to a display device;
assigning, by the discovery service, the discovery key code to the display device; and
transmitting, by the discovery service, the discovery key code to the display device for display on the display device.

2. The method of claim 1, further comprising:
receiving an input of the discovery key code from the input device; and
connecting the input device to the display device.

3. The method of claim 1, wherein the input device is a game controller and the display device comprises a television or monitor.

4. The method of claim 1, further comprising:
searching, by the discovery service, for one or more display devices of the plurality of display devices that are available to connect to the input device;
determining a quantity of available display devices based on the searching; and
determining discovery key code length based on the quantity of available display devices.

5. The method of claim 1, wherein quantity of inputs of the input device the discovery key code is dynamically adjusted based on a quantity of currently registered display devices within the discovery group.

6. The method of claim 1, further comprising:
receiving, by the discovery service, a request including an input for connection to the display device from an input device; and
comparing, by the discovery service, the input with the discovery key code.

7. The method of claim 6, further comprising:
transmitting, by the discovery service to the display device, an offer to connect with the input device in response to determining that a match exists between the input and the discovery key code.

8. The method of claim 7, further comprising:
in response to determining that a match does not exist between the input and the discovery key code, comparing, by the discovery service, the input with one or more additional discovery key codes assigned to one or more additional display devices of the plurality of display devices selected from at least one of:
a device connected to a WiFi network to which the input device is connected;
a device connected to a subnet to which the input device belongs; and
one or more display devices to which the input device has previously connected.

9. The method of claim 8, further comprising:
receiving, by the discovery service from a display device, an answer to connect to the input device.

10. The method of claim 7, further comprising:
determining, by the discovery service, that the input matches with a second discovery key code of a second display device of the plurality of display devices on a different WiFi network than the input device is connected to; and
transmitting an instruction, by the discovery service to the input device, to connect to the different WiFi network.

11. The method of claim 1, wherein the display device is assigned to the discovery group based on a matching hint that indicates at least one of:
an IP address of the display device;
a WiFi network to which the display device is connected;
a wired network to which the display device is connected;
a geographic location of the display device; and
a previously-used identifier of the display device.

12. A system comprising:
a server comprising:
a network interface configured to couple to at least one network;
at least one processor coupled to the network interface; and
a computer-readable medium coupled to the processor and storing instructions to manipulate the at least one processor to execute a discovery service, the discovery service configured to:
register a display device of a plurality of display devices based on a unique identifier of the display device;
assign the display device to a discovery group, the discovery group associating the display device with other display devices of the plurality of display devices that are permitted by the discovery service to connect to an input device;
generate a discovery key code unique to the display device within the discovery group and a discovery key code length indicating a quantity of inputs of the input device to be included in a request for connection to a display device;
assign the discovery key code to the display device; and
transmit, via the network interface, the discovery key code to the display device for display on the display device.

13. The system of claim 12, wherein the discovery service further is configured to:
receive, via the network interface, an input of the discovery key code from the input device; and
facilitate connection of the input device to the display device responsive to the input of the discovery key code.

14. The system of claim 12, wherein the input device is a game controller and the display device comprises a television or monitor.

15. The system of claim 12, wherein the discovery service further is configured to:
search for one or more display devices of the plurality of display devices that are available to connect to the input device;
determine a quantity of available display devices based on the search; and
determine the discovery key code length based on the quantity of available display devices.

16. The system of claim 12, wherein quantity of inputs of the input device indicated by the discovery key code is dynamically adjusted based on a number quantity of currently registered display devices within the discovery group.

17. The system of claim 12, wherein the discovery service further is configured to:
receive, via the network interface, a request including an input for connection to the display device from an input device; and
compare, by the discovery service, the input with the discovery key code.

18. The system of claim 17, wherein the discovery service further is configured to:
transmit, to the display device via the network interface, an offer to connect with the input device in response to determining that a match exists between the input and the discovery key code.

19. The system of claim 18, wherein the discovery service further is configured to:
in response to determining that a match does not exist between the input and the discovery key code, compare the input with one or more additional discovery key codes assigned to one or more additional display devices of the plurality of display devices selected from at least one of:
a device connected to a WiFi network to which the input device is connected;
a device connected to a subnet to which the input device belongs; and
one or more display devices to which the input device has previously connected.

20. The system of claim 19, wherein the discovery service further is configured to:
receive, from a display device via the network interface, an answer to connect to the input device.

21. The system of claim 18, wherein the discovery service further is configured to:
determine that the input matches with a second discovery key code of a second display device of the plurality of display devices on a different WiFi network than the input device is connected to; and transmit, to the input device via the network interface, an instruction to connect to the different WiFi network.

22. The system of claim 12 wherein the display device is assigned to the discovery group based on a matching hint that indicates at least one of:

an IP address of the display device;
a WiFi network to which the display device is connected;
a wired network to which the display device is connected;
a geographic location of the display device; and
a previously-used identifier of the display device.

23. The system of claim 12, further comprising:
at least one of the input device or the display device.

* * * * *

UNITED STATES PATENT AND TRADEMARK OFFICE
CERTIFICATE OF CORRECTION

| | |
|---|---|
| PATENT NO. | : 12,070,679 B2 |
| APPLICATION NO. | : 17/275126 |
| DATED | : August 27, 2024 |
| INVENTOR(S) | : Guru Somadder et al. |

Page 1 of 1

It is certified that error appears in the above-identified patent and that said Letters Patent is hereby corrected as shown below:

In the Claims

At Column 19, Claim 5, Line 2, please delete "the discovery key" and insert --indicated by the length of the discovery key--

At Column 20, Claim 16, Line 31, please delete "number"

Signed and Sealed this
Twenty-second Day of April, 2025

Coke Morgan Stewart
*Acting Director of the United States Patent and Trademark Office*